US008398097B2

(12) United States Patent
Junk et al.

(10) Patent No.: US 8,398,097 B2
(45) Date of Patent: Mar. 19, 2013

(54) HINGED BEAM RETAINER

(75) Inventors: Richard A. Junk, Elkhorn, WI (US); Ryan S. Jaskowiak, Wauwatosa, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 304 days.

(21) Appl. No.: 12/697,026

(22) Filed: Jan. 29, 2010

(65) Prior Publication Data

US 2011/0186004 A1 Aug. 4, 2011

(51) Int. Cl.
*B62B 7/02* (2006.01)

(52) U.S. Cl. .................... 280/47.315; 417/234; 417/364; 417/539; 123/195 R; 280/47.24; 280/79.4; 280/79.5; 280/47.32; 280/652

(58) Field of Classification Search .............. 123/195 R; 280/47.24, 47.315, 79.4, 79.5, 48.32, 652, 280/655.1; 134/172; 417/234, 364, 539
See application file for complete search history.

(56) References Cited

U.S. PATENT DOCUMENTS

| | | | | |
|---|---|---|---|---|
| 884,651 | A | 4/1908 | Frey | |
| 2,727,753 | A | 12/1955 | Johnson | |
| 3,423,103 | A | 1/1969 | Maltarp | |
| 3,485,017 | A | 12/1969 | Duran | |
| 3,527,469 | A | 9/1970 | Gobin | |
| 3,534,432 | A | 10/1970 | Davies | |
| 3,694,855 | A | 10/1972 | Meyer | |
| 3,950,817 | A | 4/1976 | McKaig | |
| 5,700,137 | A * | 12/1997 | Simonette | 417/364 |
| 5,992,811 | A * | 11/1999 | McFerren et al. | 248/316.3 |
| 6,695,235 | B2 | 2/2004 | Faller | |
| 6,935,642 | B1 * | 8/2005 | Craig et al. | 280/47.24 |
| 7,128,344 | B2 * | 10/2006 | Sharp | 280/830 |
| 7,384,245 | B2 * | 6/2008 | Hernandez et al. | 417/234 |
| 7,438,300 | B1 * | 10/2008 | Zien et al. | 280/79.5 |
| 2006/0102212 | A1 * | 5/2006 | Leasure et al. | 134/172 |
| 2007/0207042 | A1 * | 9/2007 | Hahn et al. | 417/234 |
| 2007/0256402 | A1 * | 11/2007 | McCane et al. | 56/10.8 |
| 2008/0031678 | A1 * | 2/2008 | Gansebom et al. | 401/139 |
| 2008/0168739 | A1 * | 7/2008 | Lynn | 52/656.9 |
| 2008/0251651 | A1 * | 10/2008 | Jackson et al. | 248/62 |

* cited by examiner

*Primary Examiner* — Marguerite McMahon
*Assistant Examiner* — James Kim
(74) *Attorney, Agent, or Firm* — Rathe Lindenbaum LLP

(57) ABSTRACT

A retainer extends across first and second overlapping hinged beams to retain the hinged beams against pivotal movement.

23 Claims, 9 Drawing Sheets

HINGED BEAM RETAINER

BACKGROUND

Appliances, such as pressure washers, lawnmowers and the like, sometimes include handles formed from multiple overlapping beams which are hinged to one another to allow the handles to be folded for transporting and storage. A bolt is used to tighten the beams against one another to inhibit pivoting of the beams during use.

DETAILED DESCRIPTION OF THE EXAMPLE EMBODIMENTS

Figure 1:
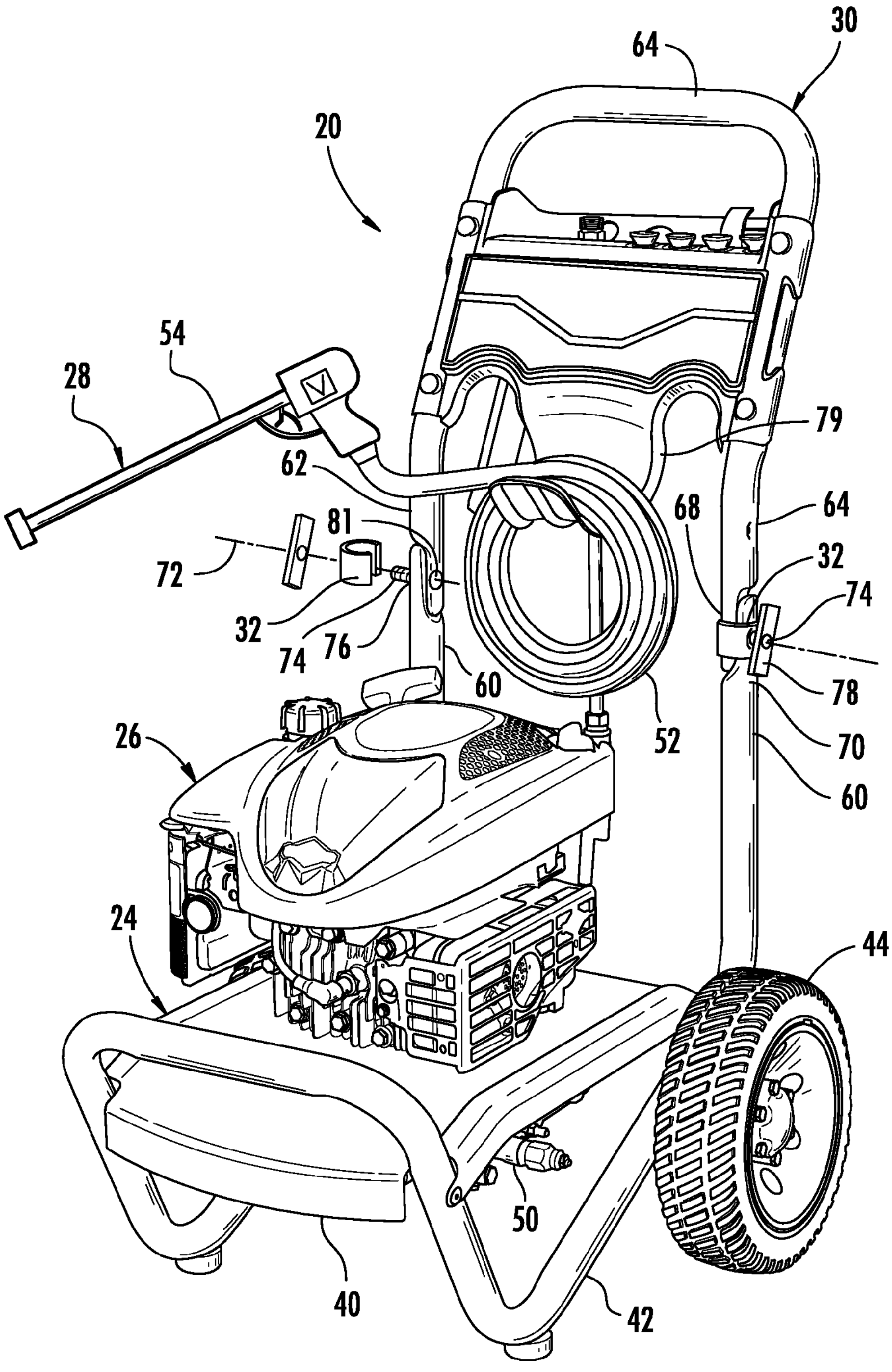
FIG. 1 is a front perspective view of a foldable appliance having a handle maintained in an unfolded state by retainers according to an example embodiment.

FIG. 1 illustrates a foldable appliance (shown as a fluid sprayer 20) according to an example embodiment. Fluid sprayer 20 delivers fluid under relatively high pressures. As will be described hereafter, fluid sprayer 20 includes a foldable handle that comprises a pair of overlapping beams which are hinged to one another, allowing the handle of the fluid sprayer 20 to be folded for compactness during transporting and storage of the fluid sprayer 20. As will be further described hereafter, fluid sprayer 20 includes retainers that extend across or overlap a junction of the overlapping beams. The retainers more reliably secure and maintain the overlapping beams and the handle against pivoting or folding movement during use of fluid sprayer 20.

Fluid sprayer 20 includes support 24, drive unit 26, working unit 28, handle 30 and retainers 32. Support 24 comprises one or more structures configured to serve as a foundation for supporting the remaining components of the foldable appliance (fluid sprayer 20). In the example illustrated, support 24 includes platform 40, frame 42 and wheels 44. Platform 40 comprises a base supporting drive unit 26 and working unit 28. In other embodiments, platform 40 may comprise bracket, a frame or other structures.

Frame 42 comprises a series of beams, brackets or other structures extending between platform 40, wheels 44 and handle 30. In the example illustrated, frame 42 is integrally formed as part of a single unitary body with portions of handle 30. In other embodiments, frame 42 may alternatively be formed as part of single unitary body with platform 40. Although illustrated as being formed from a shaped tubular member, frame 42 may have other configurations.

Wheels 44 are rotationally coupled to frame 42 and assist in elevating portions of frame 42 and platform 40 above a supporting surface or ground. In the example illustrated, wheels 44 freely rotate or idle. In other embodiments, wheels 44 may be powered or driven by an engine or motor. Although fluid sprayer 20 is illustrated as including a pair of wheels 44 (one of which is shown), wherein a front end of frame 42 rests upon the ground or underlying surface, in other embodiments, fluid sprayer 20 may include three, four or additional wheels. In yet another embodiment, wheels 44 may be omitted or replaced with other ground motive mechanisms such as tracks, skis or the like. Although wheels 44 illustrated as being rotationally coupled to frame 42, in other embodiments, wheels 44 may alternatively be operably coupled to platform 40 or to portions of drive unit 26 or working unit 28.

Drive unit 26 comprises a unit or mechanism configured to provide or supply torque or other motive force to working unit 28. In the example illustrated, drive unit 26 comprises an internal combustion engine operably coupled to working unit 28 and supported by support 24. In other embodiments, drive unit 26 may alternatively comprise electrically powered motor. In the yet other embodiments, drive unit 26 may be omitted, such as where working unit 28 is manually powered.

Working unit 28 comprises one or more mechanisms configured to utilize the received torque or force to transform or work upon the surrounding environment or a medium. In the example illustrated, working unit 28 comprises fluid pump 50, hose 52 and spray gun 54. Fluid pump 50 is suspended below platform 40 and is configured to pressurize fluid, such as water. According to one embodiment, the pump serving as working unit 50 comprises a pump at least similar to the pump shown and described in U.S. Pat. No. 6,092,998 to Dexter et al. which issued on Jul. 25, 2000, the full disclosure of which is hereby incorporated by reference. Hose 52 is connected to fluid pump 50 and delivers pressurize fluid from fluid pump 52 spray gun 54. Spray gun 54 allows a person to selectively control and direct the emission of pressurized fluid.

In other embodiments, working unit 28 may comprise mechanisms configured to perform other functions. For example, in other embodiments, working unit 28 may comprise transmission and cutting blades of a lawnmower, trimmer or other cutting mechanism, the transmission and auger of a snow thrower or snow blower, the transmission and tines or blades of a tiller, the electrical power generating components of an electrical generator or other working mechanisms.

Handle 30 extends from support 24 and is configured to be manually grasped by a person using appliance 20, allowing the person to reposition and move appliance 20. Handle 30 includes lower beams 60, upper beams of 62 and cross member 64. Lower beams 60 form a lower portion of handle 30 and extend upwardly from support 24 on opposite transverse sides of appliance 20. In the example illustrated, lower beams 60 are integrally formed as part of a single unitary body with the tubular members of frame 42. In other embodiments, lower beams 60 may alternatively be joined to frame 42 or to platform 40 directly or indirectly in other manners. In the example illustrated, lower beams 60 comprise tubular members. In other embodiments, lower beams 60 may alternatively have other cross-sectional shapes. Lower beams 60 are coupled to upper beams 62.

Upper beams 62 and cross member 64 form an upper portion of handle 30. Upper beams 62 have lower portions 68 that overlap upper portions 70 of lower beams 60. Upper beams 62 are hinged or pivotally coupled to lower beams 60 for pivotal movement about pivot axis 72. In the example illustrated, upper beams 62 are hinged to lower beams 60 about axis 72 by shafts 74 extending along axis 72 through one or more apertures 76 formed in overlapping portions 68, 70 of lower beams 60 and upper beams 62, respectively, and also located across or aligned with axis 66.

In the example illustrated, shafts 74 are provided by elongate bolts having a head 81 at one end and a threaded portion at another end, wherein a threaded nut 78 retains the bolt within and across the one of more apertures 76. In the example illustrated, the nut 78 is configured as a handle, similar to a thumbscrew, facilitating manual rotation of the shaft without the use of tools. Head 81 and nut 78 may be tightened and loosened with respect to overlapping portions 68, 72 inhibit pivoting of beams 60, 62 about axis 72 or to allow a person to pivot and fold handle 30 to a folded state, respectively.

In other embodiments, lower beams 60 and upper beams 62 may be hinged to one another in other fashions. For example, in other embodiments, other structures may be utilized to provide shafts 74 and other structures may be used to retain shafts 74 within apertures 76. In another embodiment, shaft 74 may include a transverse opening through which a cotter pin or other retainer may be used to retain shaft 74 through and across apertures 76. In one embodiment, bolt head 81 may alternatively comprise a hexagonal bolt head. In yet another embodiment, any one of a variety of hinges may be utilized.

In the example illustrated, upper beams 62 comprise tubular structures (circular, oval, polygonal or other cross-sectional shapes). Lower portions 68 of upper beams 62 are crimped or collapsed so to have a concave outer side having a cavity for partially receiving portions 70 of lower beams 60. In other embodiments, lower portions 68 of upper beams 62 may alternatively be molded or otherwise formed to have a concave outer side having a cavity for at least partially receiving portions 70 of lower beams 60. In still other embodiments, this relationship may be reversed, wherein portions 70 of lower beams 60 are crimped or collapsed so to have a concave outer side having a cavity for partially receiving portions 68 of upper beams 62. In other embodiments, upper portions 70 of lower beams 60 may alternatively be molded or otherwise formed to have a concave outer side having a cavity for at least partially receiving portions 68 of upper beams 62. Because one of portions 68, 70 or mains largely tubular, the rigidity and strength of handle 30 at the overlap of portions 68, 70 is substantially maintained.

Cross member 64 comprises a member extending between and interconnecting upper beams 62. Cross member 64 cooperates with upper beams 64 to form a U-shaped handle. In the example illustrated, cross member 64 comprises tubular member integrally formed as part of a single unitary body with both of upper beams 62. In other embodiments, cross member 64 may comprise separate member fastened, welded or connected to upper beams 62.

As further shown by FIG. 1, handle 30 may additionally be used to support and carry additional structures such as the hose hook 79 shown. In yet other embodiments, handle 30 may be utilized to support controls for one or both of drive unit 26 or working unit 28. Although handle 30 is illustrated as being substantially an inverted U, in other embodiments, handle 30 may have other configurations wherein handle 30 is configured to be folded from an extended use state (shown in FIG. 1) to a collapsed or folded state.

Retainers 32 comprise mechanisms configured to inhibit pivoting or folding of the upper portion of handle 30 relative to the lower portion of handle 30. In particular, retainers 32 inhibit pivoting of upper beams 62 relative to lower beams 60 about pivot axis 72. Retainers 32 overlap a junction between portions 68 and 70 of beams 60 and 62 to inhibit such pivoting. As a result, even when the fit and frictional hold between overlapping portions 68 and 70 may loosen and lessen over time or as a result of vibrations encountered during the use of washer 20, upper beams 62 and the upper portion of handle 30 are less likely to accidentally pivot or fold about axis 72. Retainers 32 inhibit relative movement of beams 60, 62 such that a user that arrived with a more stable feel as if beams 60 and 62 were single continuous beams rather than foldable beams.

Figure 2:
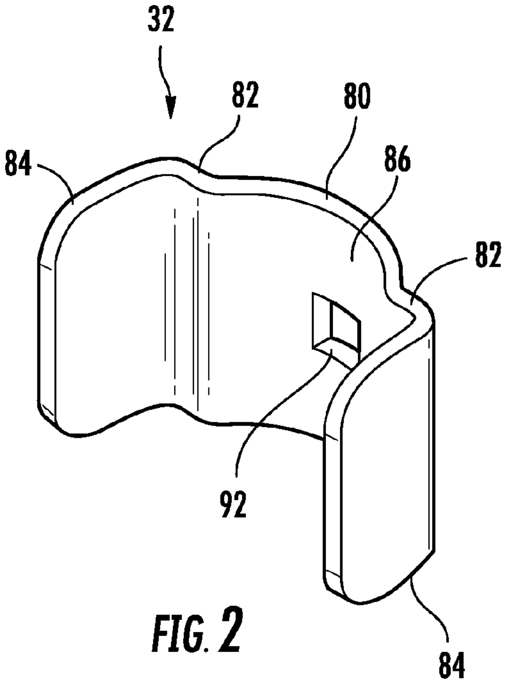
FIG. 2 is a isometric view of one of the retainers of FIG. 1.
Figure 3:
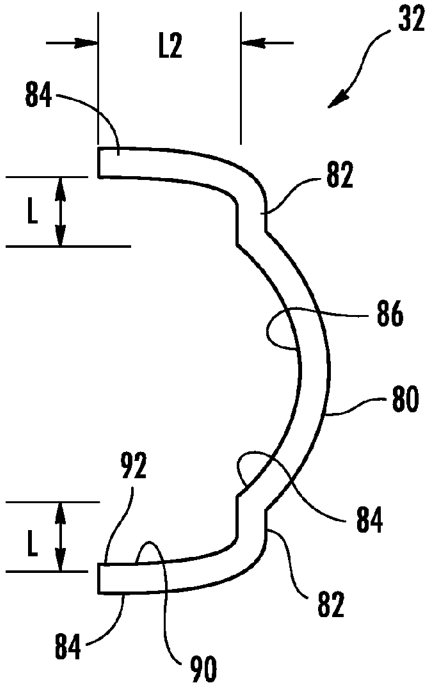
FIG. 3 is a top plan view of the retainer of FIG. 2.
Figure 4:
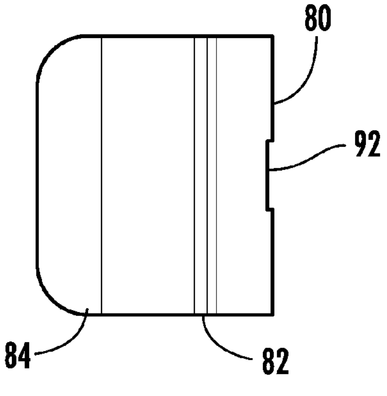
FIG. 4 is a side view of the retainer of FIG. 2.

FIGS. 2-4 illustrate one of retainers 32 in more detail. As shown by FIG. 2-4, retainer 32 comprises a generally C-shaped, open sided clip having a central portion 80, extensions 82 and a pair of opposite arms 84. Central portion 80, extensions 82 and arms 84 cooperate to form a concave side or cavity 84 configured and sized to receive one of overlapping portions 68, 70, to extend across a seam or junction between overlapping portions 68, 70 and to at least partially overlap the other of portions 68, 70. As shown in FIG. 3, central portion 80 includes an inner surface 86 having a cross-sectional profile that substantially matches an outer profile of one of overlapping portions 68, 70. In the example illustrated in which portions 70 of lower beams 60 have a substantially circular cross-sectional profile, surface 86 of central portion 80 is also provided with an arcuate, and substantially circular, shape. As a result, central portion 80 more closely mates, contacts and abuts against the opposite portion 70 of lower beams 60 to more securely retain beams 60 and 62 against relative movement. In other embodiments in which the outer cross-sectional profile of portions 70 (or portions 68) has other configurations such as oval configurations or polygonal configurations, surface 86 may likewise be provided with a corresponding shape and dimensions.

Extensions 82 project from opposite sides of central portion 80 between central portion 80 and arms 84. As shown by FIG. 3, each of extensions 82 widens or increases the distance D separating arms 84 and the width of cavity 84. Extensions 82 each have a length L sufficient to accommodate a thickness of overlapping portions 68 which partially receives portions 70. In the example illustrated, length L of each of extensions 82 is sufficiently close to the thickness of each of overlapping portions 68 overlapped by arms 84 such that inner surfaces 90 of arms 84 contact and certainly engage opposite surfaces of portions 68. As a result, arms 84 more stably secure and bear against portions 68 to better inhibit relative movement of beams 60, 62.

Arms 84 comprise flanges, wings, or other projections extending from extensions 82 in a direction substantially or generally perpendicular to extensions 82. Arms 84 each have a length L2 of sufficient size to extend across and overlap the seam or junction between portions 68, 70. In the example illustrated in which each retainer 32 is largely stiff and rigid, being formed from 12 gauge steel, arms 84 to find a largely unchanging mouth 92 of retainer 32. Mouth 92 receives both beams 60 and 62, particularly portions 68 and 70. Because arms 84 are largely inflexible, a more secure fit and retention of beams 60 and 62 are achieved.

In other embodiments, one or more sections of central portion 80, extensions 82 or arms 84 may be resiliently flexible to some extent such that mouth 92, at rest, may be smaller than portions 68, 72 be received within cavity 84. In such an embodiment, arms 84 may extend inwardly. In such an embodiment, arms 84 resilient flex outwardly during reception of portions 68, 70 and resiliently return towards the at rest state to grip portions 68, 70.

As further shown by FIG. 2, retainer 32 includes an aperture 92 extending through central portion 80. Aperture 92 is located such that when retainer 32 receives portions 68, 70, after 90 to extend across and may be substantially aligned with pivot axis 72 and apertures 76. Aperture 92 is sized to receive shaft 74 such that shaft 74 may extend through aperture 92. As a result, retainer 32 utilizes the already existing or already utilized shaft 74 to further retain and secure retainer 32 in position and in place relative to portions 68 and 70.

Although aperture 92 is illustrated as being square, aperture 92 may be circular or may have other shapes. In still other embodiments, other structures are mechanisms may be used to secure and retain retainer 32 in place. For example, in other embodiments, retainer 32 may be held in place merely using a friction or clamping force against portions 68, 70. In yet other embodiments, other hooks, pins, claws or structures may be used to hold or retain retainer 32 in place with respect to portions 68 and 70 of beams 62 and 60, respectively.

Figure 5:
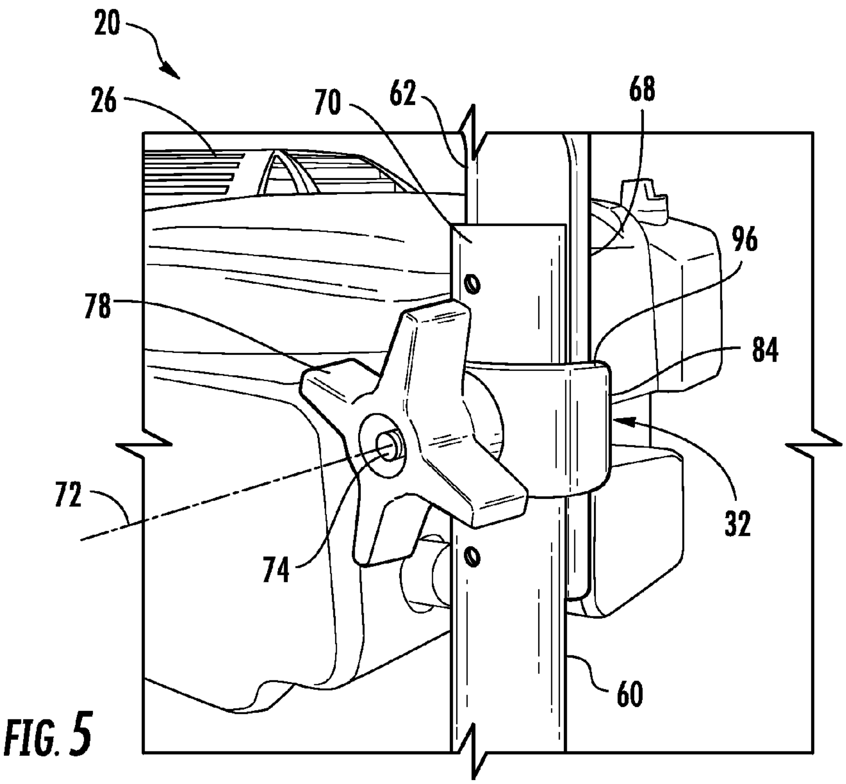
FIG. 5 is a perspective view of the retainer of FIG. 2 on the appliance of FIG. 1 in a locked position.
Figure 6:
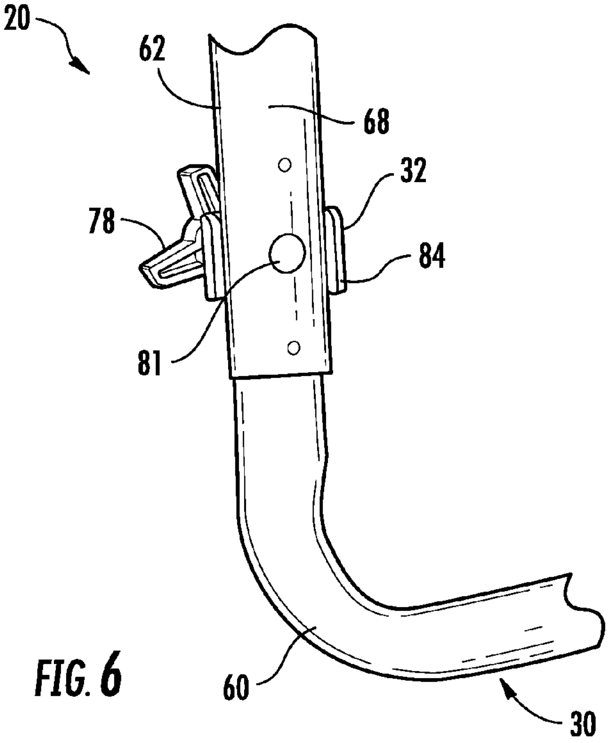
FIG. 6 is another perspective view of the retainer of FIG. 2 on the appliance of FIG. 1 in a locked position.
Figure 7:
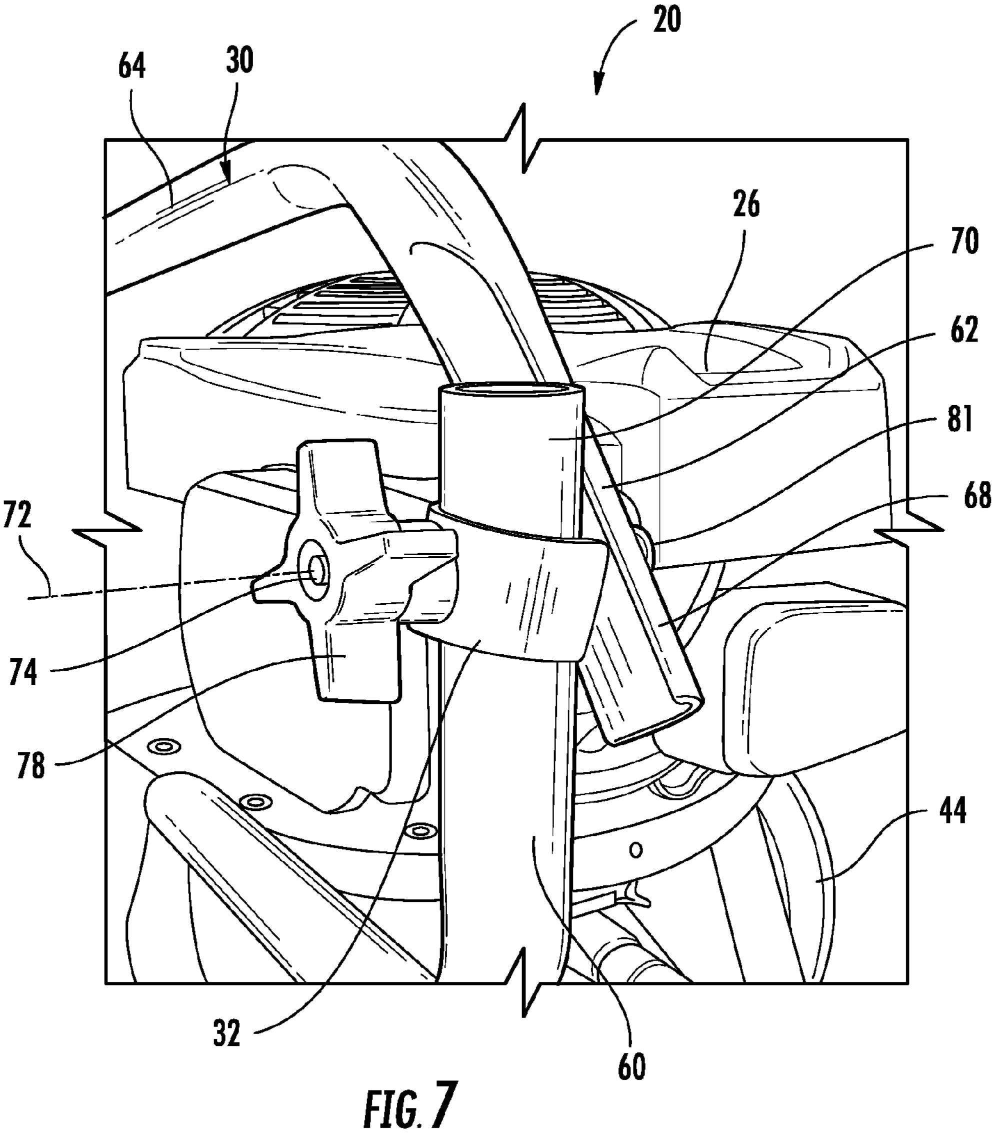
FIG. 7 is a perspective view of the retainer of FIG. 2 in an unlocked position and the appliance in a folded state.

FIGS. 5-7 illustrate use of retainer 32 in more detail. FIGS. 5 and 6 are enlarged views of portions of handle 30 illustrating handle 30 in an extended state in which retainer 32 secures beams 60 and 62 against pivoting or folding. As shown by FIGS. 5 and 6, head 81 and nut 78 are tightened so as to compress and urge portions 68 and 70 against one another. Head 81 and nut 78, when sufficiently tightened, urge and retain arms 84 across the seam or juncture 96 between portions 68 and 70. As a result, when retainer 32 is in the locked state or position shown, portions 68 may not substantially pivot about axis 72 without first contacting surfaces 90 of arms 84. Although portions 68 are illustrated as extending on an inside of portions 70 of lower beams 60, in other embodiments, this relationship may be reversed. For example, in other embodiments, head 81 may alternatively be positioned adjacent to an exterior of portions 70. Likewise, although central portion 80 is illustrated as being adjacent to nut 78, in other embodiments, retainer 32 may be repositioned such that central portion 80 extends adjacent to head 81 on an opposite side of portions 68, 70 as nut 78.

FIG. 7 illustrates handle 30 in a folded or least partially folded state. FIG. 7 illustrates head 81 and nut 78, sufficiently loosened or spaced apart, to allow retainer 32 to be moved along shaft away from portions 68, 70 such that arms 84 are retracted or withdrawn from across the seam or juncture 96 between portions 68 and 70. FIG. 7 further illustrate an upper handle 30, upper beams 62 and their lower end portions 68, pivoted about axis 72 to a collapsed or folded state. When retainer 32 is in this unlocked state or position, handle 30 may be folded for more compact transport and storage.

Note that retainer 32 may be shifted or actuated between its locked state shown in FIGS. 5 and 6 and its unlocked state shown in FIG. 7 without complete removal or separation of retainer 32 from handle 30. Retainer 32 may be shifted or actuated between its locked state shown in FIGS. 5 and 6 and its unlocked state shown in FIG. 7 without disconnection of beams 60, 62 or disconnection of shaft 74, head 81 or nut 78 from one another. As a result, switching retainer 32 between the locked and unlocked states may be more easily performed without the risk of retainer 32, shaft 74, head 81 or nut 78 becoming misplaced.

FIGS. 8-11 illustrate retainer 132, another embodiment of retainer 32. As with retainer 32, retainer 132 portions 68, 70 of beams 60 and 62 to inhibit pivoting or folding of beams 60, 62 relative to one another. Retainer 132 generally comprises a hollow open-ended cylinder or tube having walls 180 having an inner diameter D2 sufficiently sized so as to receive and completely encircle both overlapping portions 68, 70 of tubes 62, 60. In the example illustrated, diameter D2 is sized only slightly larger than the combined diameter of the widest portion of portions 68, 70 such that interior surfaces 186 contact portions 68, 70 at at least a multitude of positions or contact point extending on substantially all sides of portions 68, 70. This tight fit between retainer 132 and portions 68, 70 provides a more stable or solid interconnection between beams 60, 62. In other embodiments, a looser fit may be provided between retainer 132 and portions 68, 70.

In one embodiment, the cross-sectional shape of interior surface 186 corresponds to the cross-sectional shape of the exterior of either or both of beams 60, 62. As a result, retainer 32 may more easily slide or be repositioned along being beams 60 or beams 62 to an unlocked position as described below. In addition, a larger percentage of interior surface 186 contacts portions 68, 70 when retainer 32 is in a locked position as described below, providing a tighter hold of beams 60, 62. Although the tube or sleeve serving as retainer 132 is illustrated as having a circular cross-section interior and a circular cross-section exterior, in other embodiments, the sleeve providing retainer 132 may have a differently shaped interior and a differently shaped exterior.

Figure 8:
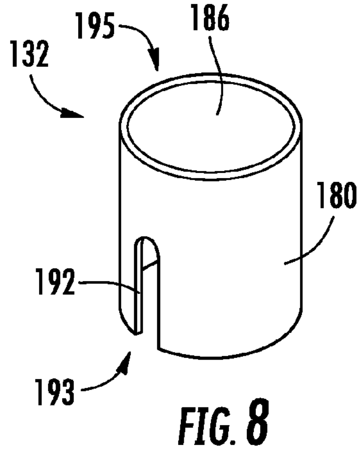
FIG. 8 is a isometric view of another embodiment of the retainer of FIG. 2.
Figure 9:
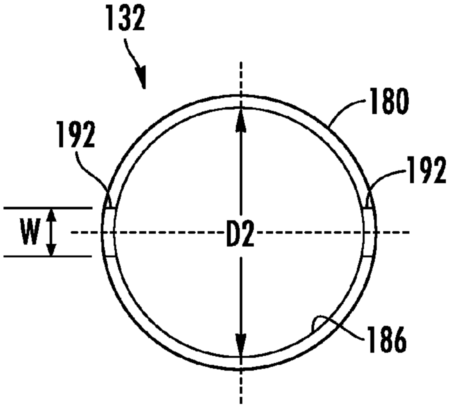
FIG. 9 is a top plan view of the retainer of FIG. 8.
Figure 10:
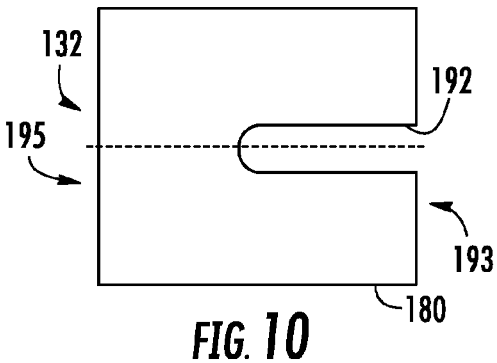
FIG. 10 is a side view of the retainer of FIG. 8.
Figure 11:
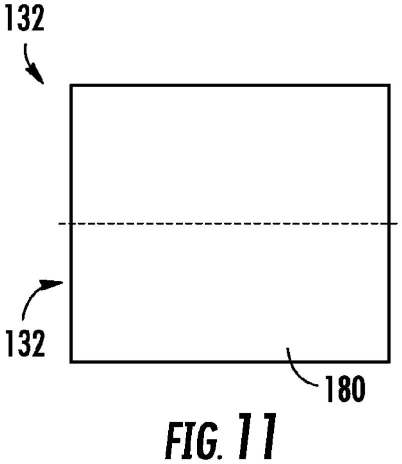
FIG. 11 is a front view of the retainer of FIG. 8.

As further shown by FIGS. 8-10, retainer 132 includes a pair of opposite aligned apertures 192. Apertures 192 are located such that when retainer 132 receives portions 68, 70, apertures 192 extends across and may be substantially aligned with pivot axis 72 and apertures 76. Apertures 192 are sized to receive shaft 174 such that shaft 174 may extend through apertures 192. As a result, retainer 132 utilizes the already existing or already utilized shaft 74 to further retain and secure retainer 132 in position and in place relative to portions 68 and 70.

Apertures 192 have a diameter or width W greater than a width of shaft 76, less than at least one dimension of head 81 (shown in FIG. 1) and less than at least one dimension of nut 78 (shown in FIG. 1). As a result, either of apertures 192 may be positioned adjacent to either of head 81 and nut 78. In other embodiments, apertures 192 may have different widths with one of aperture 192 being smaller than head 81 and the other of apertures 192 being smaller than nut 78.

Figure 12:
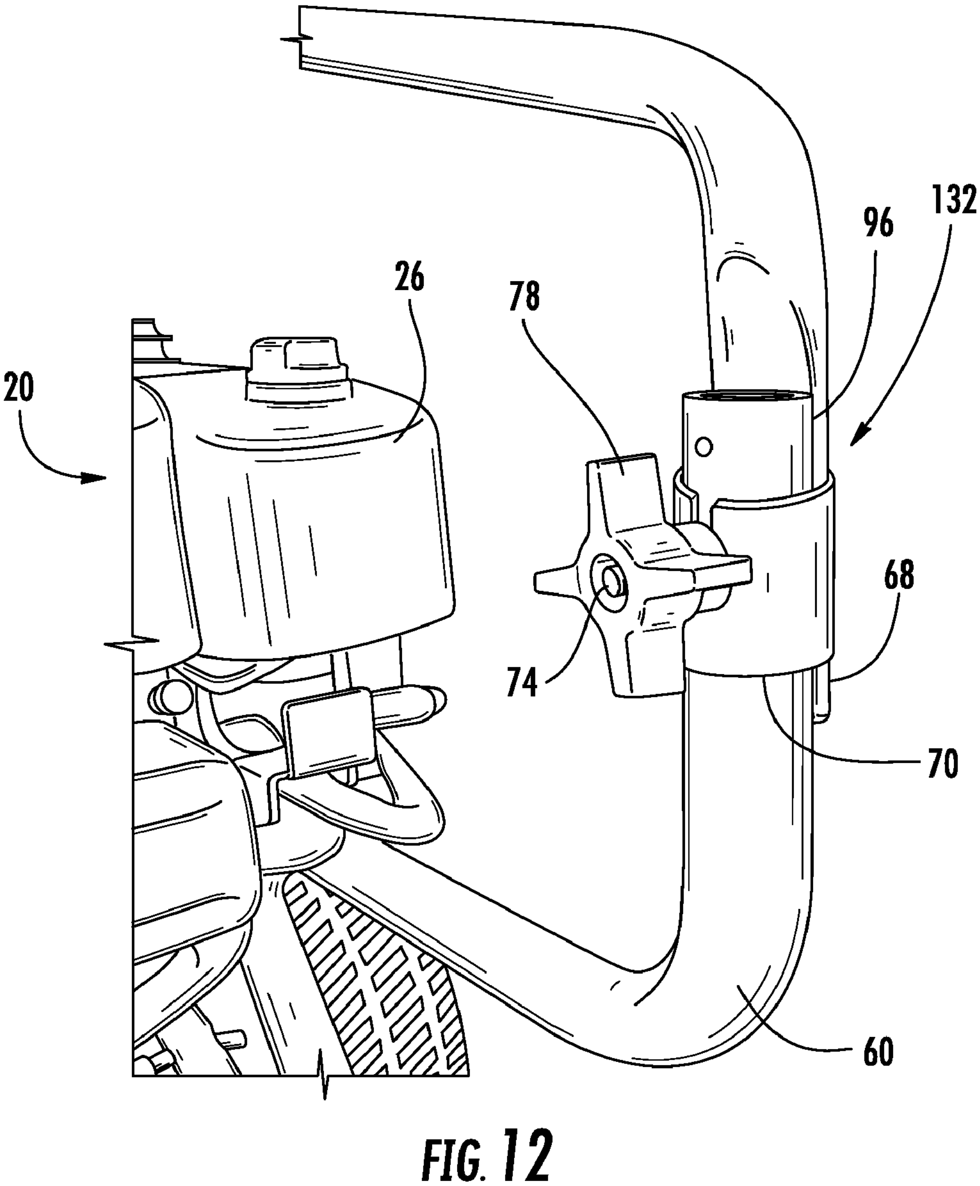
FIG. 12 is a perspective view of the retainer of FIG. 8 on the appliance of FIG. 1 in a locked position.
Figure 13:
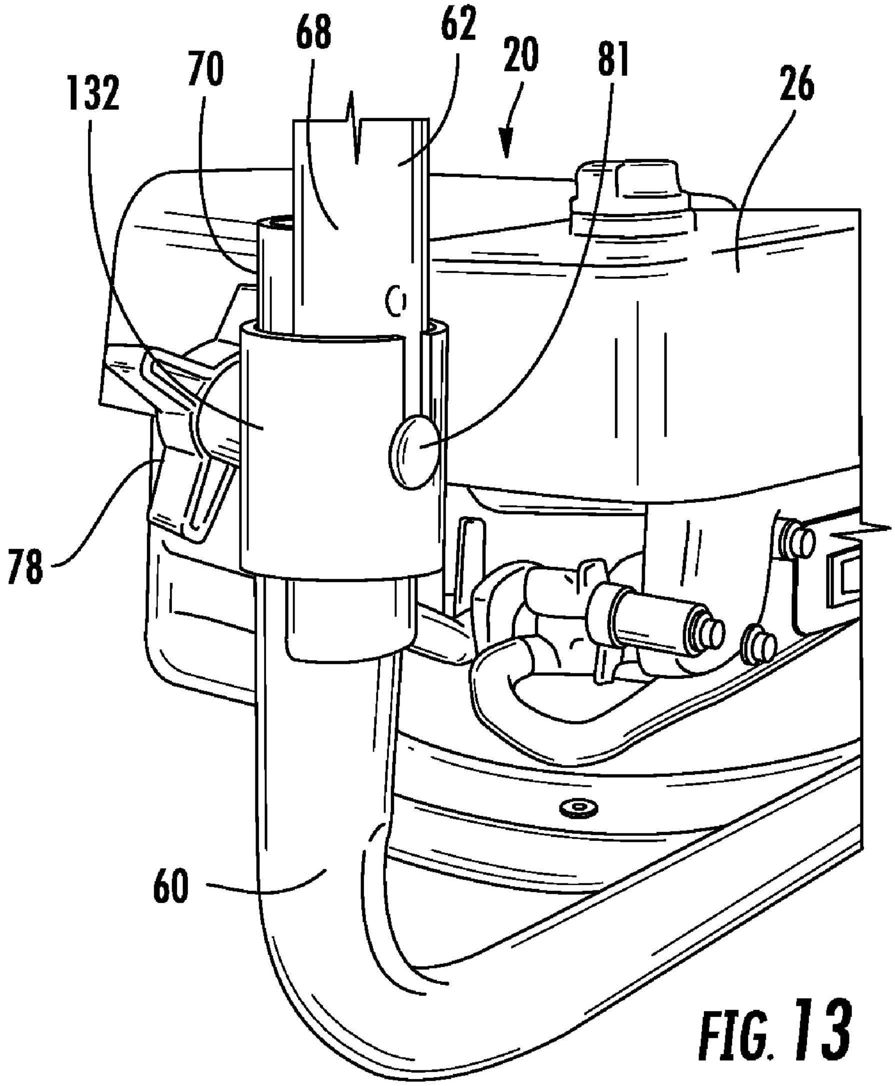
FIG. 13 is another perspective view of the retainer of FIG. 8 on the appliance of FIG. 1 in a locked position.
Figure 14:
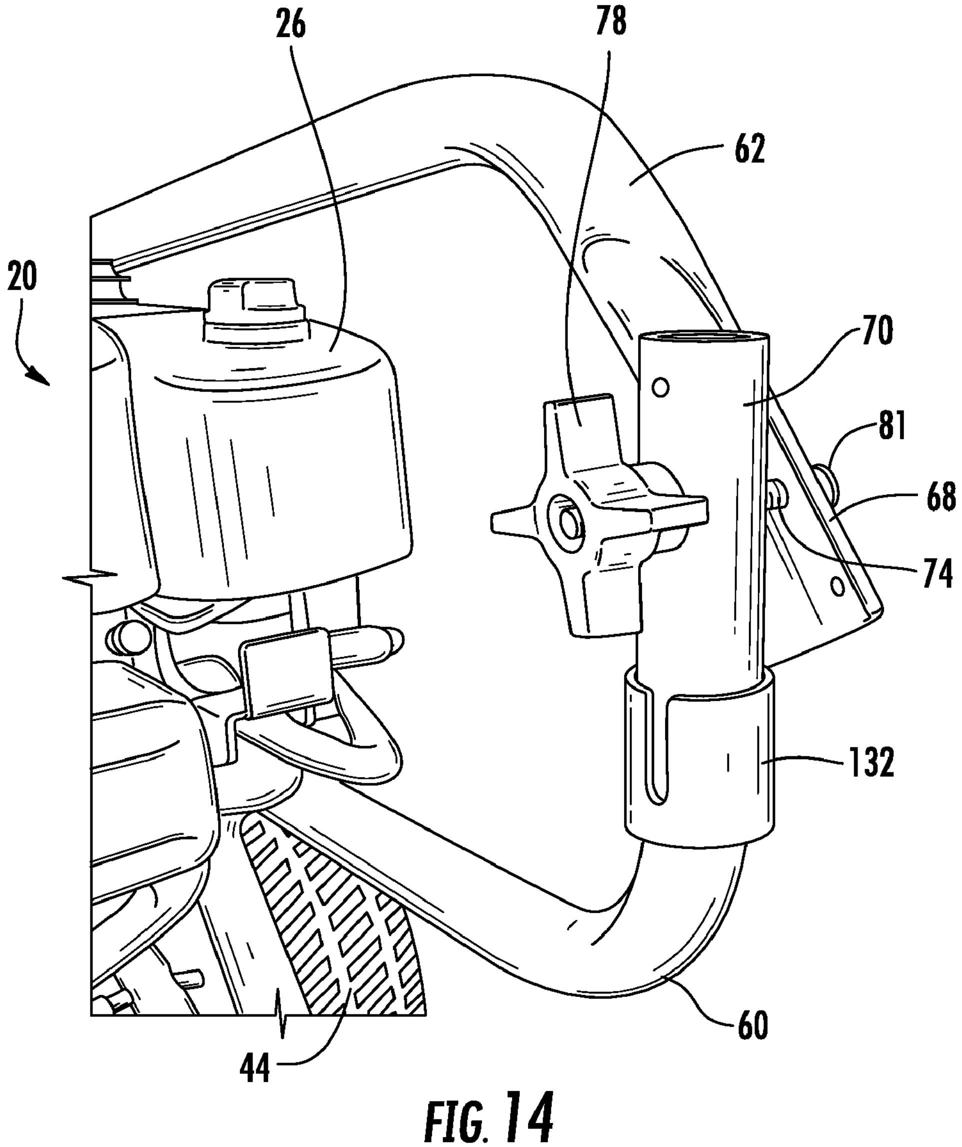
FIG. 14 is a perspective view of the retainer of FIG. 8 in an unlocked position on the appliance of FIG. 1 in a folded state.

As shown by FIGS. 8 and 10, apertures 192 comprise elongate slots extending from the first axial end 193 partially towards end to a second opposite axial end 195. The slots providing apertures 192 enable retainer 132 to be axially-slid or moved relative to shaft 74 while shaft 74 extends through and pivotally joins beams 60, 62. As a result, as shown in FIGS. 12-14 described hereafter, retainer 132 may be slid between locked and unlocked states or positions without removal or disconnection of beams 60, 62, shaft 74, nut 78 or head 81 from one another. In other embodiments, however, apertures 192 may alternatively comprise continuously bounded or partially bounded openings which inhibit sliding movement of retainer 132 relative to shaft 74. In such an alternative embodiment, shaft 74 is removed to permit retainer 132 to be slid along tubes 60, 62 between locked and unlocked states.

FIGS. 12-14 are enlarged views of retainer 132 used on sprayer 20 (fully shown in FIG. 1) in place of retainer 32. FIGS. 12 and 13 are enlarged views of portions of handle 30 illustrating handle 30 in an extended state in which retainer

132 secures beams 60 and 62 against pivoting or folding. As shown by FIGS. 12 and 13, head 81 and nut 78 are tightened so as to frictionally engage and compress opposite outer surfaces of walls 180 about apertures 192. As a result, head 81 and nut 78 inhibit or prevent separation of retainer 32 and nut 78, head 81 and shaft 74, maintaining retainer 32 in place about shaft 74 as well as about portions 68, 70. When retainer 32 extends about portions 68, 70, portions 68 may not substantially pivot about axis 72 without contacting surface 186 of walls 180.

Although FIGS. 12 and 13 illustrates the slots of apertures 192 extending upwardly when in the locked state shown, in other embodiments, retainer 132 may be flipped when initially positioned upon handle 30 such that the slots of aperture 192 extend or face in a downward direction. In such an embodiment, gravity assists in retaining retainer 132 in position upon shaft 74 in the locked state. In such embodiments, reliance upon the friction between head 81, nut 78 and the outer sides of retainer 132 to hold retainer 132 in the locked position is reduced or completely alleviated. Rather than being slid in a downward direction to move retainer 132 to an unlocked state or position, retainer 132 would be lifted or slid upwardly to move retainer 132 to an unlocked state.

FIG. 14 illustrates handle 30 in a folded or least partially folded state. FIG. 14 illustrates head 81 and nut 78, sufficiently loosened or spaced apart, to allow retainer 132 to be moved along shaft 74 away from portions 68, 70 such retainer 132 is retracted or withdrawn from across the seam or juncture 96 between portions 68 and 70. FIG. 14 further illustrates an upper handle 30, upper beams 62 and their lower end portions 68, pivoted about axis 72 to a collapsed or folded state. When retainer 32 is in this unlocked state or position, handle 30 maybe folded for more compact transport and storage.

Note that retainer 132 may be shifted or actuated between its locked state shown in FIGS. 12 and 13 and its unlocked state shown in FIG. 14 without complete removal or separation of retainer 132 from handle 30. Retainer 132 may be shifted or actuated between its locked state showing FIGS. 12 and 13 and its unlocked state shown in FIG. 14 without disconnection of beams 60, 62 or disconnection of shaft 74, head 81 or nut 78 from one another. As a result, switching retainer 132 between the locked and unlocked states may be more easily performed without the risk of retainer 132, shaft 74, head 81 or nut 78 becoming misplaced.

Figure 15:
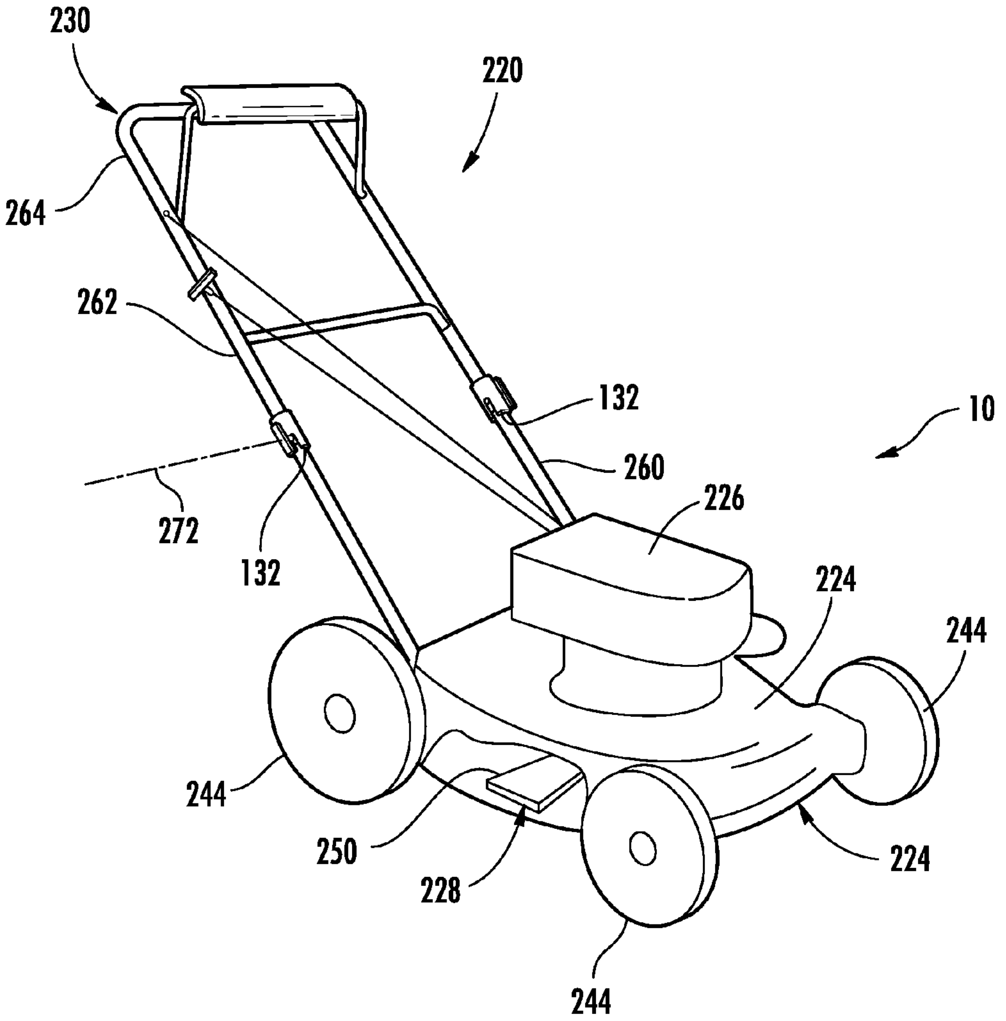
FIG. 15 is a front perspective view of a foldable appliance (lawnmower) having a handle maintained in an unfolded state by the retainer of FIG. 8 according to an example embodiment.

FIG. 15 is a perspective view illustrating retainer 132 employed on another folding appliance comprising a walk behind lawnmower 220. In addition to retainers 132, mower 220 comprises support 224, drive unit 226, working unit 228, and handle 230. Support 224 comprises one or more structures configured to serve as a foundation for supporting the remaining components of the foldable appliance (mower 220).

Drive unit 226 comprises a unit or mechanism configured to provide or supply torque or other motive force to working unit 228. In the example illustrated, drive unit 226 comprises an internal combustion engine operably coupled to working unit 228 and supported by support 224. In other embodiments, drive unit 226 may alternatively comprise electrically powered motor. In the yet other embodiments, drive unit 226 may be omitted, such as where working unit 228 is manually powered.

Working unit 228 comprises one or more mechanisms configured to utilize the received torque or force to transform or work upon the surrounding environment or a medium. In the example illustrated, working unit 228 comprises a transmission (not shown) and cutting blade 250. Cutting blade 250 is suspended below support 224 and is configured to be rotated at a high-speed to cut vegetation.

Handle 230 extends from support 224 and is configured to be manually grasped by a person using appliance 220, allowing the person to reposition and move appliance 220. Handle 230 includes lower beams 260, upper beams of 262 and cross member 264. Lower beams 260 form a lower portion of handle 230 and extend upwardly from support 224 on opposite transverse sides of appliance 220. In the example illustrated, lower beams 260 comprise tubular members. In other embodiments, lower beams 260 may alternatively have other cross-sectional shapes. Lower beams 260 are coupled to upper beams 262.

Upper beams 262 and cross member 264 form an upper portion of handle 230. Upper beams 262 have lower portions 268 that overlap upper portions 270 of lower beams 260. Upper beams 262 are hinged or pivotally coupled to lower beams 260 for pivotal movement about pivot axis 272. In the example illustrated, upper beams 262 are hinged to lower beams 260 about axis 272 by shafts 274 extending along axis 272 through one or more apertures 276 formed in overlapping portions 268, 270 of lower beams 260 and upper beams 262, respectively, and also located across or aligned with axis 272.

In the example illustrated, shafts 74 are provided by elongate bolts having a head 81 at one end and a threaded portion at another end, wherein a threaded nut 78 retains the bolt within and across the one of more apertures 276. In the example illustrated, the nut 78 includes a handle, similar to a thumbscrew, facilitating manual rotation of the shaft without the use of tools. Head 81 and nut 78 may be tightened and loosened with respect to overlapping portions 268, 270 to inhibit pivoting of beams 260, 262 about axis 272 or to allow a person to pivot and fold handle 230 to a folded state, respectively.

In other embodiments, lower beams 260 and upper beams 262 may be hinged to one another in other fashions. For example, in other embodiments, other structures may be utilized to provide shafts 74 and other structures may be used to retain shafts 74 within apertures 192. In another embodiment, shaft 74 may include a transverse opening through which a cotter pin or other retainer may be used to retain shaft 74 through and across apertures 192. In one embodiment, bolt head 281 may alternatively comprise a hexagonal bolt head. In yet another embodiment, any one of a variety of hinges may be utilized.

In the example illustrated, upper beams 262 comprise tubular structures (circular, oval, polygonal or other cross-sectional shapes). Lower portions 268 of upper beams 262 are crimped or collapsed so to have a concave outer side having a cavity for partially receiving portions 270 of lower beams 260. In other embodiments, lower portions 68 of upper beams 262 may alternatively be molded or otherwise formed to have a concave outer side having a cavity for at least partially receiving portions 270 of lower beams 260. In still other embodiments, this relationship may be reversed, wherein portions 270 of lower beams 260 are crimped or collapsed so to have a concave outer side having a cavity for partially receiving portions 268 of upper beams 262. In other embodiments, upper portions 270 of lower beams 260 may alternatively be molded or otherwise formed to have a concave outer side having a cavity for at least partially receiving portions 268 of upper beams 262. Because one of portions 268, 270 or mains largely tubular, the rigidity and strength of handle 30 at the overlap of portions 268, 270 is substantially maintained.

Cross member 264 comprises a member extending between and interconnecting upper beams 262. Cross member 264 cooperates with upper beams 264 to form a U-shaped handle. In the example illustrated, cross member 264 comprises tubular member integrally formed as part of a single unitary body with both of upper beams 262. In other embodiments, cross member 264 may comprise separate member fastened, welded or connected to upper beams 262.

Although handle 230 is illustrated as being substantially an inverted U, in other embodiments, handle 230 may have other configurations wherein handle 230 is configured to be folded from an extended use state (shown in FIG. 1) to a collapsed or folded state.

As when employed on sprayer 20, when employed with the mower 220, retainers 132 inhibit pivoting or folding of the upper portion of handle 230 relative to the lower portion of handle 230. In particular, retainers 232 inhibit pivoting of upper beams 262 relative to lower beams 260 about pivot axis 272. Retainers 232 overlap a junction between portions 268 and 270 of beams 260 and 262 to inhibit such pivoting. As a result, even when the fit and frictional hold between overlapping portions 268 and 270 may loosen and lessen over time or as a result of vibrations encountered during the use of lower 20, upper beams 262 and the upper portion of handle 230 are less likely to accidentally pivot or fold about axis 272. Retainers 232 inhibit relative movement of beams 260, 262 such that a user that arrived with a more stable feel as if beams 260 and 262 were single continuous beams rather than foldable beams.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:

a support;

a working member;

a drive unit carried by the support and operably coupled to the working member to drive the working member;

a first beam extending from the support;

a second beam partially overlapping the first beam and pivotally connected to the first beam for pivotal movement about a pivot axis;

a first retainer overlapping the first beam and the second beam in a direction parallel to the pivot axis to inhibit pivoting of the second beam relative to the first beam, wherein the retainer has an aperture across the pivot axis; and a shaft extending along the pivot axis through the first beam, the second beam and the aperture.

2. The apparatus of claim 1, wherein the drive unit comprises an internal combustion engine.

3. The apparatus of claim 1 further comprising:

a third beam extending from the support;

a fourth beam partially overlapping the third beam and pivotally connected to the third beam for pivotal movement about the pivot axis; and a second retainer overlapping the third beam and the fourth beam to inhibit pivoting of the fourth beam relative to the third beam.

4. The apparatus of claim 3 further comprising a cross member between the second beam in the fourth beam, the cross member forming a handle.

5. The apparatus of claim 4, wherein the second beam, the fourth beam and the cross member are integrally formed as a single unitary body and collectively are U-shaped.

6. The apparatus of claim 1, wherein the working member comprises a pressure washer pump.

7. The apparatus of claim 1, wherein the first retainer comprises a sleeve comprising a tube completely and continuously extending about the first beam and the second beam while receiving the first beam and the second beam.

8. The apparatus of claim 7, where the sleeve includes the aperture over the pivot axis.

9. The apparatus of claim 8, wherein the aperture comprises an elongate slot extending from an axial end of the sleeve and wherein the elongate slot slidably receives the shaft to allow the tube to be slid along the first beam and the second beam, parallel to the first beam and the second beam, while the tube is receiving the first beam and the second beam and while the shaft extends through the elongate slot, through the first beam and through the second beam.

10. The apparatus of claim 1, wherein the retainer comprises an open sided clip receiving one of the first beam and the second beam and partially receiving the other of the first beam and the second beam.

11. The apparatus of claim 10, wherein the clip has an aperture across the pivot axis.

12. The apparatus of claim 1, wherein the first beam comprises a tube, wherein the second beam comprises a tube, and wherein a portion of the tube of the second beam is collapsed so as to have a C-shaped cross-section overlapping the first beam.

13. An apparatus comprising:

a retainer having an aperture configured to receive a bolt pivotably hinging a first beam and a second handle beam of a power appliance along a pivot axis, the retainer configured to receive one of the first beam and the second beam while overlapping the first beam and the second beam in a direction parallel to the pivot axis to inhibit pivoting of the second beam relative to the first beam.

14. The apparatus of claim 13, wherein the retainer comprises a sleeve comprising a tube to completely and continuously extend about the first beam and the second handle beam, the tube having a pair of opposite elongate slots and an inner diameter sized to receive the first beam and the second beam, wherein the pair of opposite elongate slots slidably receive the bolt to allow the tube to be slid along the first beam and the second beam, parallel to the first beam and the second beam, while the tube is receiving the first beam and the second beam and while the bolt extends through the elongate slot, through the first beam and through the second beam.

15. The apparatus of claim 13, wherein the retainer comprises an open sided clip configured to receive one of the first beam and the second beam and partially receive the other of the first beam and the second beam.

16. A method comprising:

hinging a first beam and a second beam of a power appliance handle with a shaft extending along a pivot axis through the first beam and the second beam;

retaining the first beam and the second beam against relative pivotal movement with a retainer receiving one of the first beam and the second beam and overlapping the first beam and the second beam in a direction parallel to the pivot axis to inhibit pivoting of the second beam relative to the first beam; and securing the retainer to the first beam and the second beam by extending the shaft through an aperture in the retainer.

17. The apparatus of claim 11, wherein the second beam has a concave side receiving the first beam and wherein the first beam is sandwiched between the retainer and the second beam in a direction parallel to the pivot axis.

18. The apparatus of claim 11, wherein the retainer comprises:

a central portion having an arcuate surface facing the first beam;

arms extending about and in contact with an exterior of the second beam; and extensions extending between the central portion and the arms, the extensions outwardly spacing apart the arms by an additional distance corresponding to a thickness of those portions of the second beam that overlap the first beam.

19. The apparatus of claim 11, wherein the clip has a mouth, the mouth having a first portion having a first width and a second portion having a second width greater than the first width.

20. The apparatus of claim 11, wherein the clip has a central portion contacting the first beam and arms contacting oppositely facing side surfaces of the second beam.

21. The apparatus of claim 15, wherein the clip comprises:

a central portion having an arcuate surface facing the first beam;

arms extending about and in contact with an exterior of the second beam; and extensions extending between the central portion and the arms, the extensions outwardly spacing apart the arms by an additional distance corresponding to a thickness of those portions of the second beam that overlap the first beam.

22. The apparatus of claim 15, wherein the clip has a mouth, the mouth having a first portion having a first width and a second portion having a second width greater than the first width.

23. The apparatus of claim 15, wherein the clip has a central portion configured to contact the first beam and arms configured to contact oppositely facing side surfaces of the second beam.

* * * * *